United States Patent

[11] 3,631,231

[72] Inventors Klaus Lagemann Garstedt; Bernd Schendel, Tornesch, both of Germany

[21] Appl. No. 8,285
[22] Filed Feb. 3, 1970
[45] Patented Dec. 28, 1971
[73] Assignee U.S. Philips Corporation New York, N.Y.
[32] Priority Feb. 15, 1969
[33] Germany
[31] P 19 07 789.5

[54] SERIAL ADDER-SUBTRACTER SUBASSEMBLY
7 Claims, 6 Drawing Figs.

[52] U.S. Cl. .......... 235/176
[51] Int. Cl. .......... G06f 7/50
[50] Field of Search .......... 235/176, 170

[56] References Cited

UNITED STATES PATENTS

| | | | |
|---|---|---|---|
| 3,105,898 | 10/1963 | Bell et al. | 235/176 |
| 3,039,691 | 6/1962 | Fleming, Jr. et al. | 235/176 X |
| 3,482,085 | 12/1969 | Smith, Jr. | 235/176 |
| 3,005,588 | 10/1961 | Shih Chieh Chao | 235/176 |
| 3,317,721 | 5/1967 | Berlind | 235/176 |
| 3,465,133 | 9/1969 | Booher | 235/175 |
| 3,112,396 | 11/1963 | Heywood | 235/170 |

*Primary Examiner*—Eugene G. Botz
*Assistant Examiner*—David H. Malzahn
*Attorney*—Frank R. Trifari

ABSTRACT: An adder-subtracter subassembly for the arithmetic unit of a digital computer. The subassembly adds or subtracts two serially received binary digits by storing each in a one-bit input register and by selectively complementing and blocking each stored digit before it is introduced into a full adder. The output of the full adder is read into a clocked output register, the output of which is connected through a second selectively operated complementing circuit and blocking circuit to a second input of the full adder.

Figure 1:
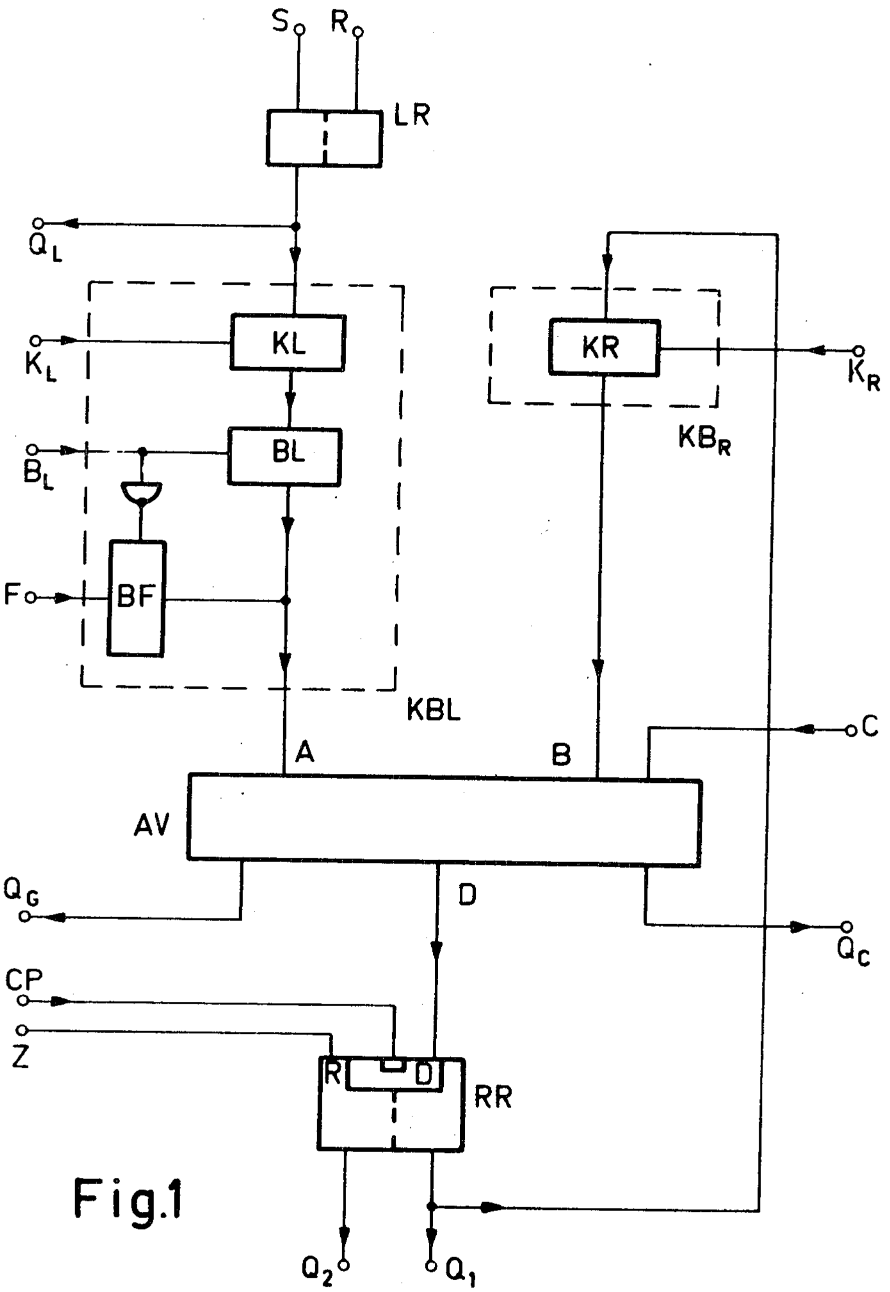

INVENTORS
KLAUS LAGEMANN
BERND SCHENDEL
BY
AGENT

INVENTORS
KLAUS LAGEMANN
BERND SCHENDEL
BY
AGENT

INVENTORS
KLAUS LAGEMANN
BERND SCHENDEL
BY
AGENT

INVENTORS
KLAUS LAGEMANN
BY BERND SCHENDEL
Frank R. Trifari
AGENT

INVENTORS
KLAUS LAGEMANN
BERND SCHENDEL
BY
Frank R. Trifari
AGENT

SERIAL ADDER-SUBTRACTER SUBASSEMBLY

The invention relates to an electronic subassembly as an arithmetic unit for processing two serially received information bits with a carry information bit. The subassembly comprises a one-bit input register of semiconductor elements, a one-bit adding stage and a clocked one-bit output register.

In the construction of digital computers it is often desirable to use assemblies prefabricated to the highest degree. In order to achieve the most reasonable manufacture and inspection it is furthermore important to use a minimum number of assemblies. Therefore, the assemblies have to be designed so that a most versatile use thereof is obtained.

This requirement can be satisfied only with great difficulty in subassemblies having a great number of circuit elements or functions. In particular, monolithic, integrated subassemblies are provided with an ever increasing number of functions, since the cost price depends only slightly on this number, making more composite subassemblies more economical. It has become common practice with such integrated subassemblies to use a given casing with a maximum number of connections so that it is not possible to enhance the flexibility of such a subassembly by additional input connections.

In digital computers a conventional construction has been generally adopted for the arithmetic unit for processing the two input information bits and the carry information. Generally this construction consists of an input register (bistable flip-flop) connected to an input of an adding stage (exclusive-OR circuit), the output of which leads to an output register. When the two input information bits are received in order of succession, the output register is used as an intermediate store for the first information bit. The output of the output register is also connected to the other input of the adding stage.

A complete processing of the two information bits requires, however, further measures. For example, negative numbers or subtractions are frequently represented by the formation of the dual complement, the "lost 1" having to be added again in the result. Moreover, in many codes for example in the excess-3 code further corrective magnitudes have to be taken into account. All circuit elements required for this purpose have to be provided as far as possible in the subassembly. This requires, however, a greater number of control inputs, whereas the subassembly comprises only a very restricted number of connections.

In larger computers a plurality of bits are always processed in parallel and generally are the bits of a decimal digit so that several adding stages and several storage elements are required for input and output registers. For reasons of manufacture they cannot be united as monolithic integrated circuits in one subassembly so that a division into a plurality of subassemblies is necessary. It is possible to encase the input register and the output register in one subassembly each and the adding stages in a further subassembly.

However, this is not advantageous in as much as the subassemblies with the storage elements can be manufactured for general use only with difficulty. In addition, the subassembly with the adding stages is required only once, while the number of storage elements in each subassembly depends upon the nature of coding of the decimal digits, since it is common practice to use codes with four or five or even more bits per decimal digit. It is therefore more advantageous to unite all those elements that are required for processing one bit or two bits to be associated with each other, that is to say to unite an input register with a storage element, an adding stage and an output register with a further storage element. Such a subassembly is then always utilized several times in a computer with parallel processing, at least a number of times corresponding to the code employed and in accordance with the greater number required for the cost of manufacture to be lower.

The invention is based on such a subassembly and obviated the aforesaid disadvantages and is characterized in that the output of the input register is connected through a complementary and blocking stage controllable from the outside of the subassembly to an input of the adding stage an additional input to the adder stage consists of the output of a further blocking stage forming with the former blocking stage a code correction network. The input of the code correction network located beyond the subassembly and is controllable by the inverted control signal of the blocking stage. The output of the adding stage is connected to the input of the output register. The output of the output register is connected through a further complementary stage controllable from beyond the subassembly to the input of the adding stage.

Figure 2:
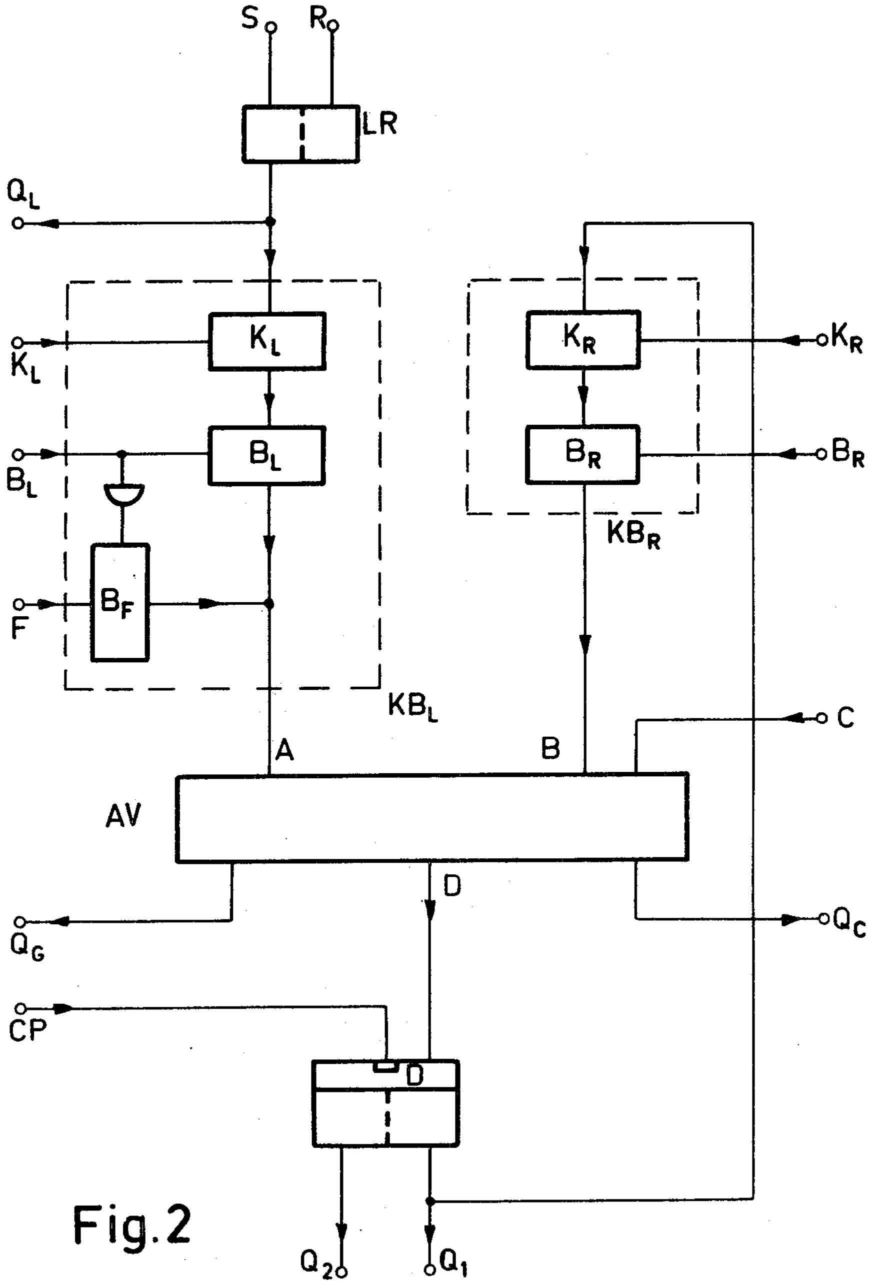
Figure 3:
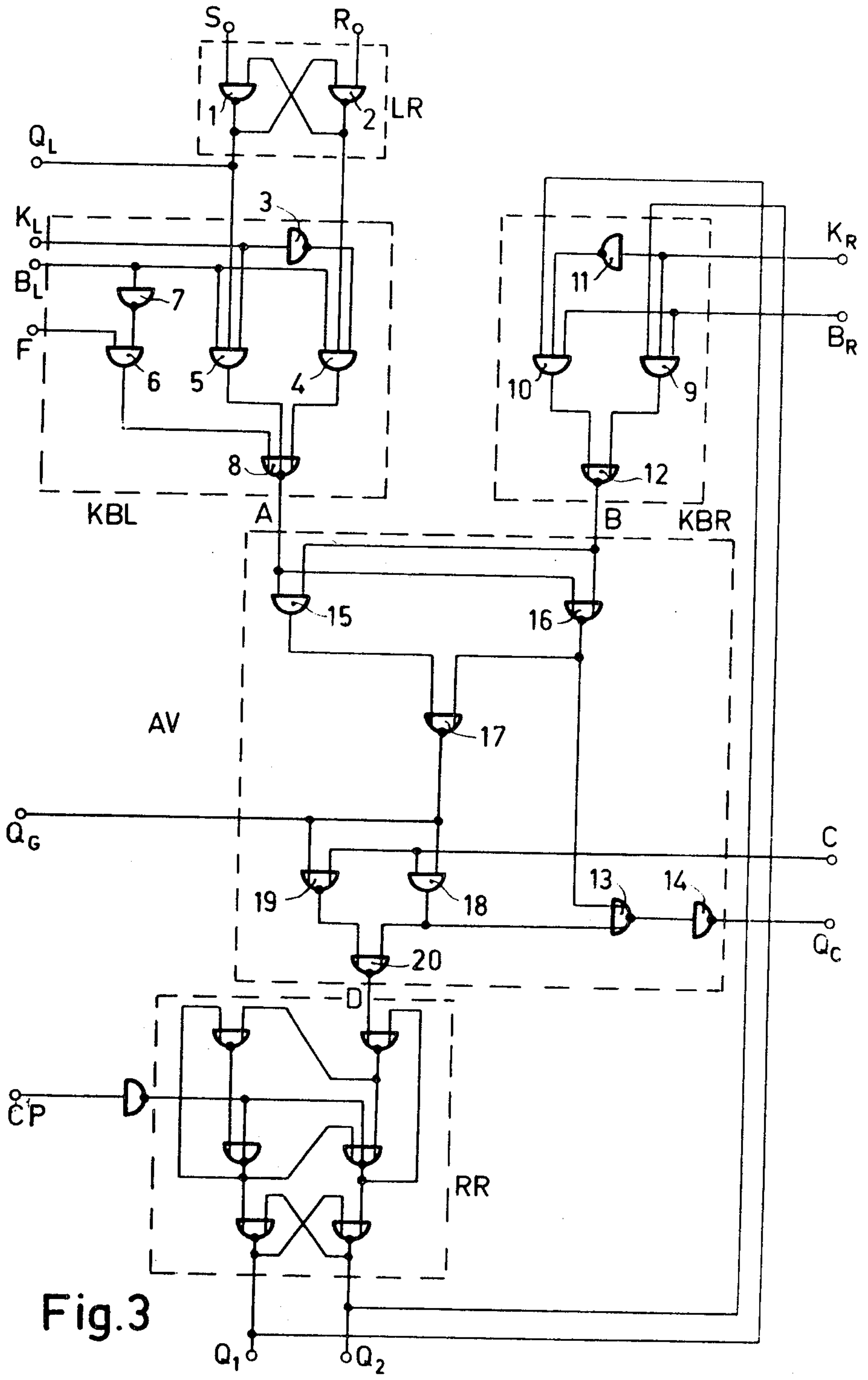
Figure 4:
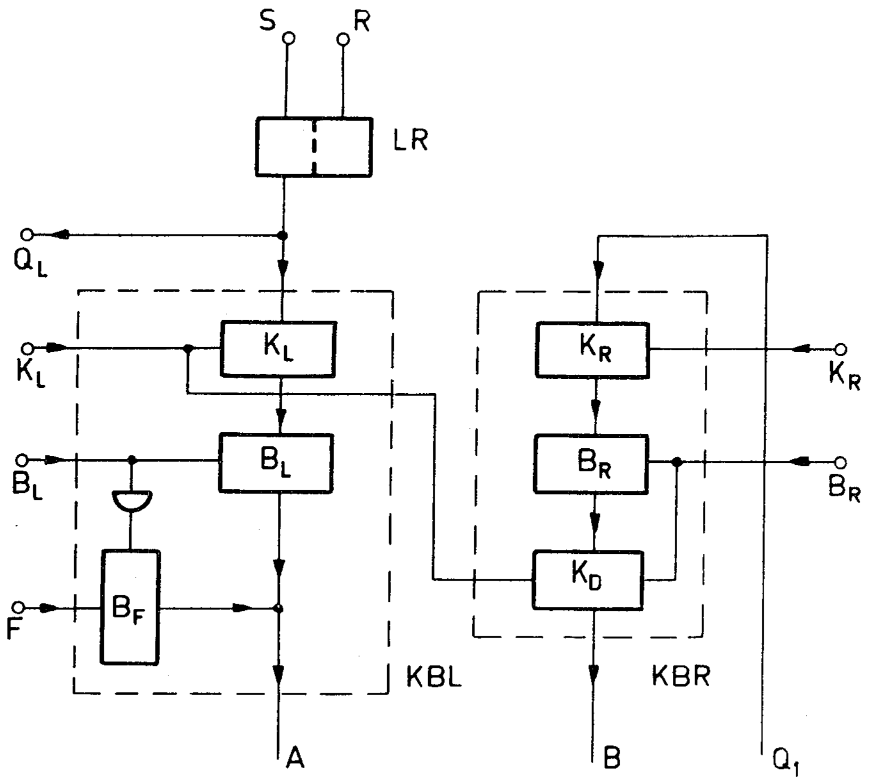
Figure 5:
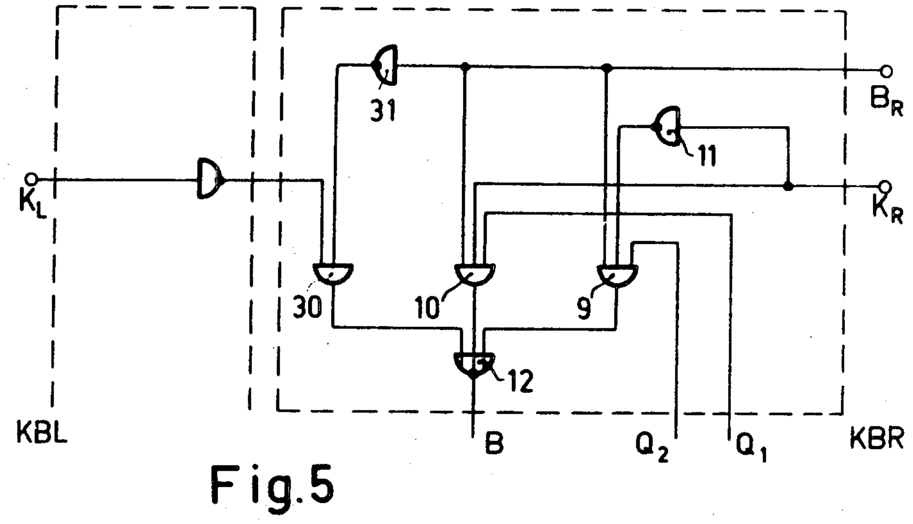
Figure 6:
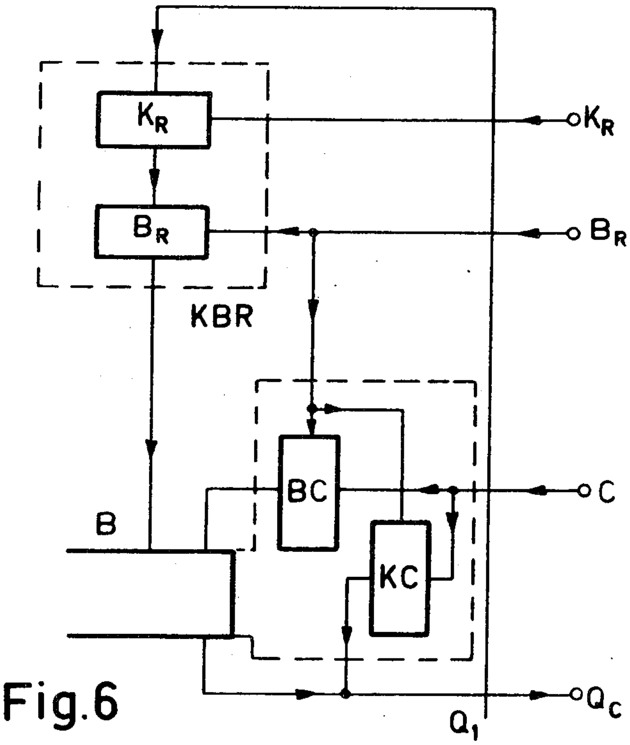

The particularities of the embodiments are described with reference to the drawing; wherein:

FIG. 1 shows the block diagram of a subassembly in accordance with the invention comprising a resetting output register, FIG. 2 is the block diagram of a variant of FIG. 1 with an additional blocking stage, FIG. 3 shows the logical circuit diagram of the block diagram of FIG. 2, FIG. 4 is the partial block diagram of a variant of FIG. 2 with a further complementary stage, FIG. 5 shows the logical circuitry of the block diagram of FIG. 4;

FIG. 6 shows a part of the block diagram of a variant of FIG. 2 with a blocking and complementary stage for the carry information.

Referring to FIG. 1, incoming information bits first get into the input register LR. This register is shown here in the form a simple RS-storing flip-flop, since it has to be controlled directly by the output signals of the read amplifier of a magnetic core store so that it serves as a read register for the magnetic core store. The output of this register is taken at point $Q_L$ out of the subassembly in order to have the read information available for rewriting in the core store. The input register LR may, however, be formed in a different way, for example, by a D flip-flop with a different control.

The output signal of the input register LR traverses the group KBL, the construction and function of which will now be explained and passes to the single information input A of the adding stage AV. The latter is formed as usual by an exclusive-OR circuit forming the intermediate sum of the two input information bits A and B and by a further exclusive-OR circuit forming the final sum D from this intermediate sum and the carry information of the preceding subassembly applied to the input C of the subassembly. This final sum is available at the presetting input of the output register or arithmetic register RR and is accepted into the register in response to a clock pulse at the input CP in the register. The adding stage comprises further gates for producing the new carry information for the next stage, which is supplied to the output $Q_C$ of the subassembly. Moreover, the output of the first exclusive-OR circuit is conducted via the output $Q_G$ out of the subassembly, that is to say prior to processing of the carry information. Thus the result of a comparison between the two input information bits is obtained, when one of the information bits is subtracted from the other.

A subtraction is generally carried out as an addition of the binary complementary value of the subtrahend. For this purpose complementary stages KL and KR are included in the two information paths to the inputs A and B of the adding stage AV and are controlled via the corresponding inputs $K_L$ and $K_R$ respectively by the instruction network of the computer concerned in accordance with the function of the arithmetic unit to be carried into effect.

Hereinafter the precise performance of the functions will be described with reference to a few examples.

In the first time period the first information bit is first written in the input register LR, for example, after interrogation of the corresponding store address. This information is then available at the output $Q_L$ for various purposes. The same information is then also present at the input A of the adding stage AV, when neither the input $K_L$ nor the input $B_L$ receive a signal so that the information can pass unchanged through the stage KL and the stage BL. At the output D of the adding stage AV then appears the sum of the input information bits of the inputs A, B and C. When the inputs B and C receive no information or the numeral 0, the information of the input A, i.e. the information of the input register LR appears at the output D of the adding stage AV, which information can then be read into the output register RR with the next time pulse at the input $C_p$ in the output register RR. Therefore in the time interval between input bits the numeral 0 has to appear at the input B of the adding stage in all parallel-operating arithmetic units independently of the previously stored information in the output register RR; a carry information does not not appear in any of these units during the interval so that no steps are required for resetting the carry information output circuits. An exception occurring under special conditions will be explained hereinafter.

The numeral 0 at the input B of the adding stage AV is obtained in the arrangement of FIG. 1 by setting the output register RR via the input Z into the 0 state. This resetting is possible up to an arbitrary instant at the beginning of the clock signal CP, for example, during the time the first information bit is written in the input register LR and passes to the output D of the adding stage AV.

In the second time interval at the beginning of the time pulse CP the first information bit present at the directly preceding instant at the output D of the adding stage AV is read into the output register RR. This information bit is therefore also present at the complementary stage KR at the input B of the adding stage AV. Simultaneously with the writing in the output register RR the second information bit can be written in the input register LR. When the inputs $K_L$ and $B_L$ do not receive further signals, this second information bit arrives unchanged at the input A of the adding stage AV.

In order to obtain a comparison result between two serially received information bits, the first information bit from the output of the output register RR is complemented in response to a signal at the input $K_R$ in the stage KR, i.e. the information bit B is subtracted from the information bit A. The result of the comparison is then available in the following manner: the outputs $Q_G$ of all arithmetic units operating in parallel are tested, for example, by an AND gate to assess whether all outputs indicate equality; if this is not the case the output $Q_C$ of the arithmetic unit processing the highest significant bit indicates whether the information bit A or the information bit B is higher.

When the two information bits have to be completely added or subtracted, instead of being compared or after comparison it is indicated by signals at the corresponding inputs $K_L$ or $K_R$ or at both which information bit has to be processed with negative sign. At any rate the result appears at the output D of the adding stage AV.

In the third time interval the result is read into in the output register RR with the next clock pulse at CP. As a result the first information bit previously stored in the output register disappears and the result is then present at the input B of the adding stage. As stated above, this result is in many cases not yet the final result. In the excess-3 code, for example, further correction values have to be added. This is performed by blocking the information bit, if any, in the input register LR by a signal at the input $B_L$ and by releasing the correction value at the input F via the stage BF. Thus the complete sum of the provisional result at the input B and of the correction value at the input A appears at the output D of the adding stage AV. This result is read into the output register RR at the next-following clock pulse at the input CP so that the arithmetic operation is accomplished.

When the next arithmetic operation has to follow immediately, the contents of the output register RR must be erased prior to the next time pulse at the input CP, which means that the final arithmetic result is available only for about half of a clock pulse period. If this time period is too short for further processing the result, a further possibility is given as is illustrated in FIG. 2 for producing a defined signal at the input B of the adding stage AV. Between the further complementary stage KR and the input B of the adding stage AV a further blocking stage BR is provided for this purpose. The blocking stage BR can be controlled from the outside of the subassembly via the input $B_R$. Since in this case the input Z of FIG. 1 is omitted, the total number of inputs remains the same. This blocking stage BR is only excited at the transfer of the first information bit to the output register RR. Thus the final result is retained for a whole clock pulse period in the output register RR and it is erased only by the reception of the new information bit.

FIG. 3 illustrates a practical embodiment of the block diagram of FIG. 2 with logical gates. The separate groups LR, KBL and so on are outlined in FIG. 3 by broken lines and designated by the same references as in FIG. 2. Inside the groups KBL and KBR FIG. 3 does not indicate stages KL, BL etc., since the function thereof are performed partially by the same gates in a practical embodiment. The stage BR of the group KBR is formed only by two additional inputs at the gates 9 and 10. The stage BL in the group KBL is formed by two additional inputs at the gates 4 and 5. Also the stage BF is formed only by the gate 6 and the additional input at the gate 8. The complementary stages $K_L$ and $K_R$ are formed, because they are both excited by flip-flop outputs by complementary signals, only by two AND-gates 4, 5 and 9, 10 respectively, which are each time excited once directly by the complementary inputs $K_L$ and $K_R$ respectively and once via the inverter 3 and 11 respectively.

The adding stage is of the conventional construction of two exclusive-OR circuits comprising each the gates 15, 16, 17, and the gates 18, 19, 20 respectively. The first exclusive-OR circuit processes the two input variables at the inputs A and B. The output of the first exclusive-OR gate is connected to the output $Q_G$ of the subassembly. The second exclusive-OR circuit 18, 19, 20 processes the intermediate from the first exclusive-OR gate and the carry signal applied to the input C. The new carry signal formed appears in the gate 13 and to this carry signal applies the following:

When in the arithmetic unit a carry signal is formed for the bit of the lowest significant arithmetic unit, it is applied as an input signal to the next higher arithmetic unit. In this unit this carry signal can release a carry signal of higher significant value which is again applied to the next higher arithmetic unit and so on so that the carry signal has to pass through all parallel-operating arithmetic units and hence through a whole chain of gates. The load is then too high for the first arithmetic unit and therefore the same gate proportioning cannot be used in any subassembly. In the path of the transfer each gate therefore includes an amplifying stage which simultaneously regenerates the level. Such an amplifier necessarily has an inverting effect so that an inverter 14 has to be added for obtaining the carry signal in the initial polarity. In this way an optimum decoupling of the individual arithmetic units is obtained.

On the other hand the arithmetic unit of the highest significant value contains, in an unfavorable case, the arithmetic result not until the carry signal of the first arithmetic unit has passed through all intermediate arithmetic units. Therefore, the arithmetic speed depends upon the transit time of the carry signal through an arithmetic unit. This transit time depends in general upon the number of amplifiers included in the transfer path. There are known arithmetic units having only one inverter in the transfer path, where the carry signal therefore changes its polarity from one arithmetic unit to the other. Such an "alternating" carry signal can be processed when all further information bits are also applied in alternating fashion. This means that in the arithmetic units having the second, fourth, etc. significant value, at the carry input of which the carry signal appears in the inverted state the other information bits present at the inputs A and B of the adding stage have also to be inverted. In the circuit diagrams of FIGS. 1 and 3 this inversion of the input information bits may be readily performed in the stages KL and KR, it being indifferent whether the first information bit is inverted already prior to setting in the output register RR in the stage KL or only afterwards in the stage KR. However, for reasons of simplification of the control the first process is preferred. The inputs $K_L$ have then to be excited alternately from one arithmetic unit to the other.

With an alternating carry signal it has, however, to be considered at the acceptance of the first information bit that when the input B of the adding stage AV is blocked by the blocking stage BR the same signal always appears at the output thereof. With an invariably inverted processing in an arithmetic unit the output signal of the blocking stage BR has therefore also to be inverted. This is performed by an additional complementary stage KD (FIG. 4). Additional inputs from beyond the subassembly are not required for this purpose, since the latter complementary stage KD operates only in conjunction with the blocking stage BR and only in the arithmetic units which process all information bits in the inverted state and receive an input signal $K_L$.

FIG. 4 illustrates how this additional complementary stage KD is excited. It receives the information bit from the stage BR and the control signals from the inputs $B_R$ and $K_L$. If, however, the first information bit to be inverted when read into the output register RR, the left-hand input of the stage KD is connected to the input $K_R$.

FIG. 5 shows the practical embodiment, from which it will be apparent that only one additional gate 30 and one inverter 31 are required.

A further possibility of a correct reading in of the first information bit with alternating carry signals that the carry signal is blocked by an additional blocking stage BC, the carry signal being applied via an inverter KC to the carry signal output, as is shown in FIG. 6. The blocking stage BC and the inverter KC are excited in parallel by a blocking signal at the input $B_R$. The complementary stage KD is in this case dispensed with. Also in this case the transfer path includes only one inverter. In a practical embodiment of this arrangement the blocking stage BC may be included in available gates by additional inputs.

Further embodiments similar to those of FIGS. 3 and 5 may be designed on the principle described and the practical embodiments may be modified in many ways in accordance with the rules of Boolean algebra.

I claim:

1. An electronic subassembly in an arithmetic unit for processing two serially received digital information bits and a carry information bit, comprising a semiconductor one-bit input register for storing each serially received digital information bit, a digital full adder having at least two digit inputs, a carry bit input, a digit output and a carry output, a first complementing means having a main conduction path and a control input for selectively complementing digital information, a first blocking means having a main conduction path and a control input for selectively blocking digital information from flowing through the main conduction path thereof in response to a signal on the input terminal thereof, means for connecting the main conduction paths of the first complementing means and the blocking means in series with an output of input register and a first digit input of the adder, a second blocking having a main conduction path and a control input for selectively blocking digital signals from passing through the main conduction path thereof in response to a signal on the control input thereof, means for connecting an input terminal of the subassembly to the first digit input of the adder through the main conduction path of the second blocking means, means for applying the inverse of signals on the control input of the first blocking means to the control input of the second blocking means whereby the first and second blocking means are alternately operated, a clocked one-bit output register having a digit input connected to the digit output of the adder, a clock pulse input for receiving clock pulses and an output for providing a signal corresponding to the signal on the digit input in response to a clock pulse, a second complementing means having a main conduction path and a control input for selectively complementing signals passing through the main conduction path in response to a signal on the control input thereof, means for connecting the control input of the second complementing means to an input terminal of the subassembly, and means for connecting the output of the output register to the second digit input of the adder through the main conduction path of the second complementing means.

2. A subassembly as claimed in claim 1, further comprising means connected to an input terminal of the subassembly for resetting the output register independently of the digit output of the adder.

3. A subassembly as claimed in claim 1, further comprising a third blocking means having a main conduction path and a control input connected to an input terminal of the subassembly for selectively blocking signals flowing through the main conduction path thereof in response to signals on the control input thereof, and means for connecting the main conduction path of the third blocking means in series with the second digit input of the adder and the main conduction path of the second complementing means.

4. A subassembly as claimed in claim 3, further comprising a third complementing means having a main conduction path and a control input for selectively complementing digital signals flowing through the main conduction path thereof in response to signals on the control input thereof, and means for connecting the main conduction path of the third complementing means between the second digit input of the adder and the third blocking means and in series therewith.

5. A subassembly as claimed in claim 4, further comprising means for connecting the control input of the third complementing means to the control input of the third blocking means.

6. A subassembly as claimed in claim 4, further comprising means for connecting the control input of the third complementing means to the control input of the first complementing means.

7. A subassembly as claimed in claim 3, further comprising a fourth blocking means having a main conduction and a control input connected to the control input of the third blocking means for selectively blocking digital signals flowing through the main conduction path in response to signals on the control input thereof, means for connecting a carry input terminal of the subassembly to the carry input of the adder through the main conduction path of the fourth blocking means, a third complementing means having a main conduction path and a control input connected to the control inputs of the third and fourth blocking means for selectively complementing digital signals flowing through the main conduction path thereof in response to signals on the control input thereof, and means for connecting the main conduction path of the third complementing means between the carry input terminal of the subassembly and the carry output of the adder.

* * * * *